US009925824B1

(12) United States Patent
Misvaer et al.

(10) Patent No.: US 9,925,824 B1
(45) Date of Patent: Mar. 27, 2018

(54) METHOD FOR GENERATING LETTERPRESSED PRODUCTS

(71) Applicant: Minted, LLC, San Francisco, CA (US)

(72) Inventors: Tonia Misvaer, Corte Madera, CA (US); Richard Baiardi, Alameda, CA (US); Mariam B. Naficy, San Francisco, CA (US)

(73) Assignee: Minted, LLC, San Francisco, CA (US)

(*) Notice: Subject to any disclaimer, the term of this patent is extended or adjusted under 35 U.S.C. 154(b) by 0 days.

(21) Appl. No.: 15/338,833

(22) Filed: Oct. 31, 2016

(51) Int. Cl.
*B44C 1/00* (2006.01)
*B41F 13/00* (2006.01)

(52) U.S. Cl.
CPC .............. *B44C 1/005* (2013.01); *B41F 13/00* (2013.01)

(58) Field of Classification Search
CPC .......... B31F 2201/07; B31F 2201/0702; B31F 2201/0712; B31F 2201/0756; B31F 2201/0758; B31F 2201/0779; B31F 2201/0782; B31F 2201/0784; B31F 2201/0792; B44C 1/00; B41F 13/00
See application file for complete search history.

(56) References Cited

U.S. PATENT DOCUMENTS

| 3,584,572 A * | 6/1971 | Apicella .................. B26D 7/27 101/24 |
| 4,216,577 A * | 8/1980 | Badet ............... G06K 19/07718 156/219 |
| 4,222,516 A * | 9/1980 | Badet ............... G06K 19/07718 228/5.1 |
| 4,867,057 A * | 9/1989 | Bradley ................. B42D 15/02 101/27 |
| 4,938,830 A * | 7/1990 | Cannistra ................ B32B 27/06 156/270 |
| 4,988,126 A * | 1/1991 | Heckenkamp ....... B42D 25/378 283/107 |
| 5,601,887 A * | 2/1997 | Rich ..................... A63F 3/0665 283/102 |
| 2002/0069771 A1* | 6/2002 | Pickford .................. B31F 1/07 101/6 |
| 2004/0076798 A1* | 4/2004 | Larsson .................... B31F 1/07 428/153 |
| 2006/0038396 A1* | 2/2006 | Thompson ......... B42D 15/0053 283/67 |
| 2010/0051484 A1* | 3/2010 | Moeini .................. A45C 11/18 206/39 |
| 2010/0078474 A1* | 4/2010 | Rosenblatt ............. G06Q 30/02 235/380 |

(Continued)

OTHER PUBLICATIONS

Printout from webpage http://invitationsbyajalon.com/blog/combine-digital-letterpress-save-money-rsvp-options-menu-options-icons-seats-reserved-milian/, entitled "Combining Letterpress and Digital Printing Methods", dated 2009, (5 pages).

(Continued)

*Primary Examiner* — David Banh
(74) *Attorney, Agent, or Firm* — Jones Day

(57) ABSTRACT

A method for producing a letterpressed printed card includes letterpressing a design into card stock, to create a card shell. The card shell has a positive image of the letterpressed design debossed into a front face of the card. After letterpressing the design, an image is printed onto the card shell, to produce the letterpressed printed card.

17 Claims, 7 Drawing Sheets

(56) References Cited

U.S. PATENT DOCUMENTS

| | | | | |
|---|---|---|---|---|
| 2010/0224516 A1* | 9/2010 | Abell | .................. | B42D 15/045 |
| | | | | 206/307 |
| 2012/0297650 A1* | 11/2012 | Burley | ................ | B42D 15/042 |
| | | | | 40/124.01 |
| 2014/0214567 A1* | 7/2014 | Llach | .................. | G06Q 20/354 |
| | | | | 705/17 |
| 2015/0269465 A1* | 9/2015 | Zimmerman | ........ | G06K 19/042 |
| | | | | 235/488 |

OTHER PUBLICATIONS

Printout from webpage www.lucyprint.com/faq/, entitled "Lucy Print Letterpress—FAQS", including a copyright notice "2009-2013", (3 pages).

Printout from webpage http://judithbaumann.com/printopia/photographicbroadside/, entitled "The Photographic Broadside at Pope Press Olympia", including a copyright notice "2015" (5 pages).

Printout from webpage http://ypps.yale.edu/blog/2014/12/03/visual-scavenger-hunt-tour-elm-city-through-print-media, entitled "Yale Printing and Publishing Services—A Visual Scavenger Hunt & Tour of the Elm City through print media", dated "Dec. 3, 2014" (1 page).

Printout from webpage www.briarpress.org/24529, entitled "Digital and Letterpress duplexed together", including message-posting dates in the year 2011 (3 pages).

Printout from webpage http://afinepress.com/combination-printing/, entitled "Combining Full-color Images With Stamping", undated (9 pages).

* cited by examiner

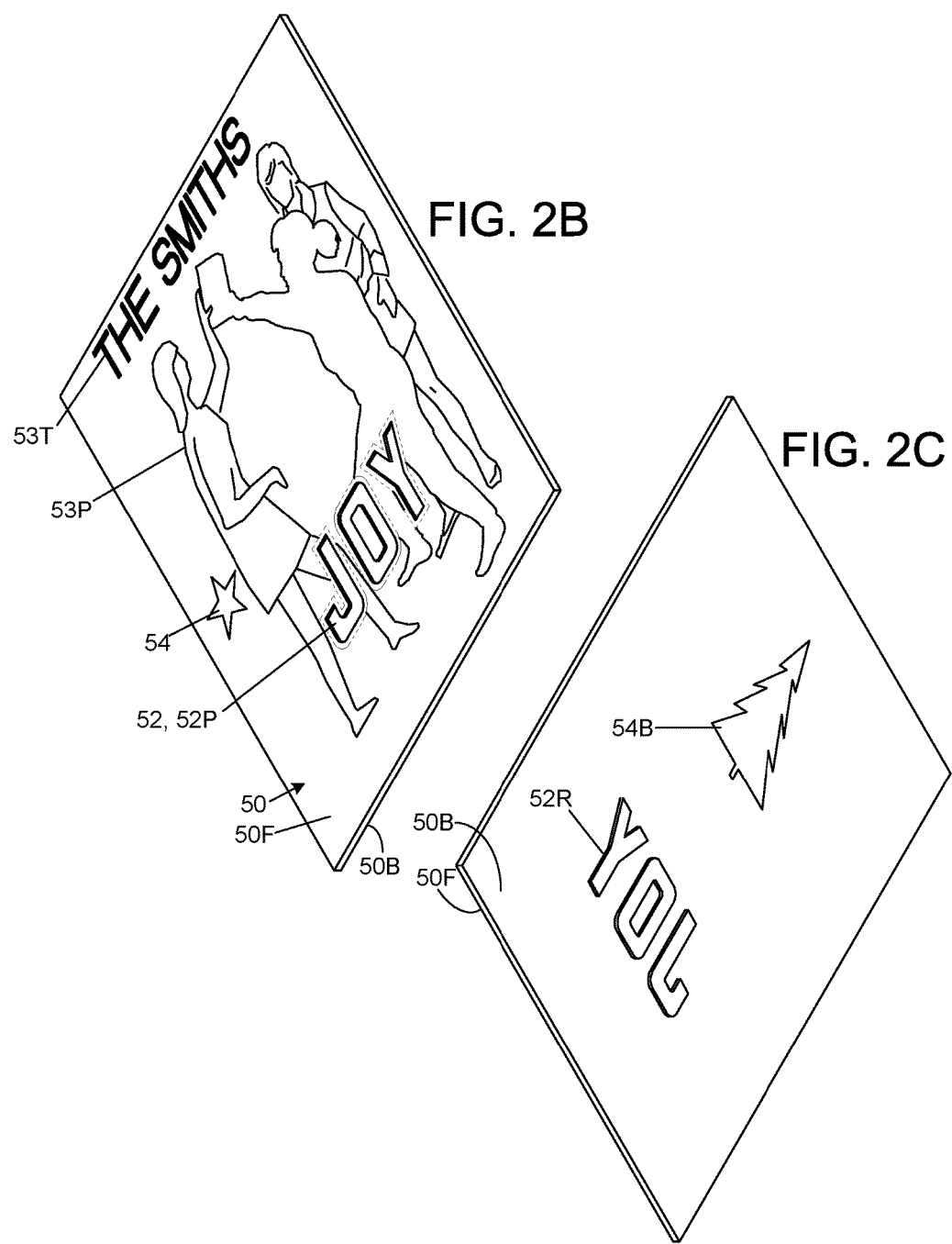

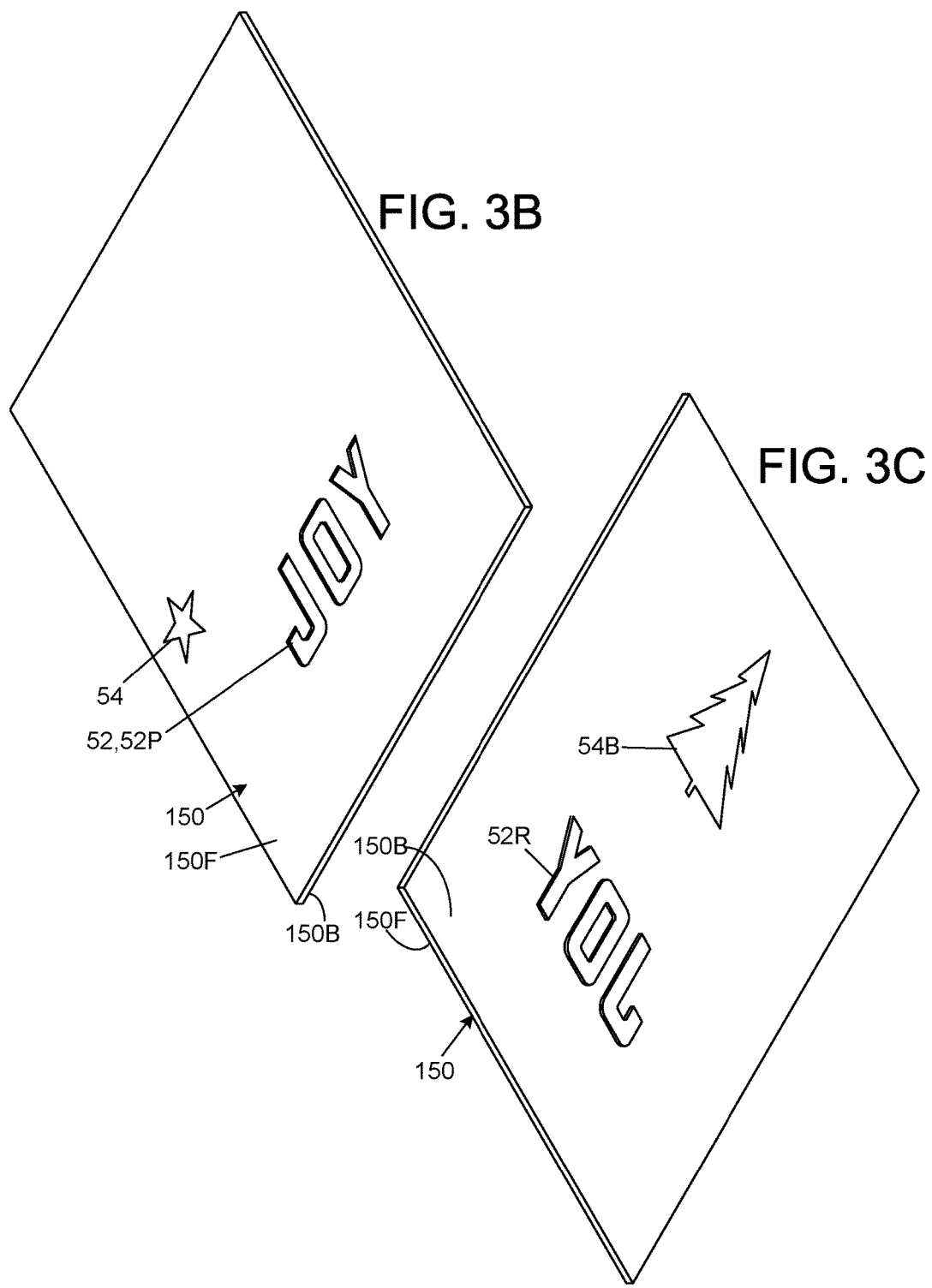

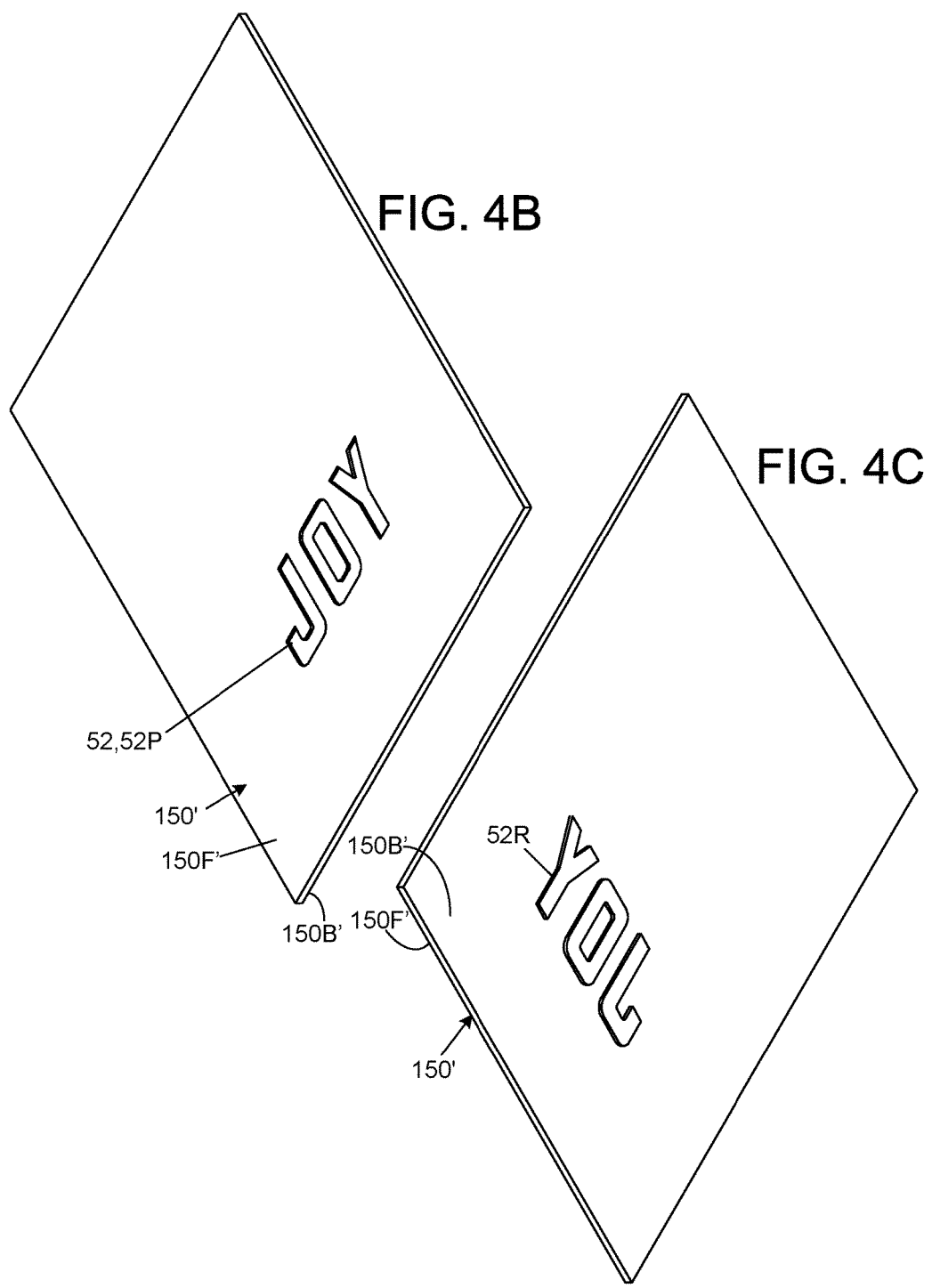

METHOD FOR GENERATING LETTERPRESSED PRODUCTS

TECHNICAL FIELD

This relates to letterpressing a design into a paper product.

BACKGROUND

Letterpress is a technique for applying a design to a card stock material. The letterpressed material is deformed such that the design is debossed into the material and depressed relative to the surrounding material. Letterpressing is performed by a letterpress machine. The machine presses the card stock material against a debossing plate. The design, which protrudes from the debossing plate, is pressed into the card stock. Before letterpressing the stock material, an image can be printed on the stock material by a printer.

SUMMARY

An example method for producing a letterpressed printed card includes letterpressing a design into card stock, to create a card shell. The card shell has a positive image of the letterpressed design debossed into a front face of the card. After letterpressing the design, an image is printed onto the card shell, to produce the letterpressed printed card.

BRIEF DESCRIPTION OF THE DRAWINGS

FIGS. 2A-2C are respectively a front view, a front perspective view and a rear perspective view of a letterpressed printed item, in which the item is a card.

FIGS. 3A-3C are respectively a front view, a front perspective view and a rear perspective view of a letterpressed card shell, from which the card of FIGS. 2A-2C might be made.

FIGS. 4A-4C are respectively a front view, a front perspective view and a rear perspective view of another letterpressed card shell, from which the card of FIGS. 2A-2C might be made.

DESCRIPTION

Figure 1:
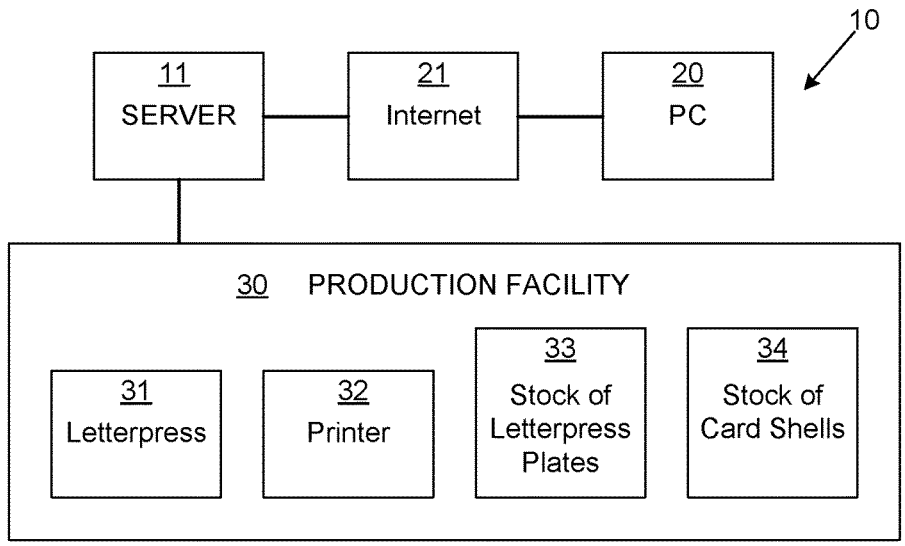
FIG. 1 is a block diagram of an example system for generating letterpressed items.

FIG. 1 is a block diagram of an example system 10 for generating a letterpress design product (letterpress artwork). The system 10 includes a server 11 associated with a vendor of art products. A communication device 20 of a customer (user) communicates with the server 11 over a network 21. The communication device 20 enables the customer to select a letterpress design product, customize the selected design product, request that the vendor make the design product, and provide payment. A production facility 30 (print facility) associated with the vendor produces (manufactures) a physical design product that matches the displayed design product that was selected and customized by the user. The print facility 30 includes a letterpress machine 31 that letterpresses print stock material with a letterpress design element of the selected-and-customized product. The print facility 30 also includes a printer 32 that prints an image of the selected-and-customized product onto the print stock material. The letterpressed-and-printed design product is then shipped to the customer.

The server 11 in this example comprises at least one non-transitory hardware server that has at least one processor. The processor executes program instructions of software code. The code is stored on a non-transitory hardware computer readable data storage medium such as a computer hard drive device, to implement functions of the server 11.

The printer 31 in this example is a digital printer that prints a digital image from a digital image file. An example digital printer is a commercial digital printing press, such as an HP INDIGO digital press printer. An example digital printing press uses a dynamic light-sensitive plate that can be re-imaged with different images. Ink in the form of charged particles is electrostatically directed to the plate, then transferred from the plate to a blanket, and then transferred from the blanket to the print stock (paper stock, card stock).

Examples of the customer's communication device 20 are the customer's personal computer and the customer's smart phone. An example of the network 21 is the Internet.

Example letterpress design products are art prints, business cards, posters, flyers, brochures, stationery, calendars, event (e.g., wedding and party) invitations, personal journals (with a decorative cover and blank inner pages for writing in) and greeting cards. These design products might comprise a paper medium (print stock of paper-like material such as paper). These design products might have a utilitarian function, such as providing information (e.g., regarding a contact, a scheduled event and personal notes). In the example procedure described below, the design product is a greeting card.

In the example of FIG. 1, the vendor's server 11 hosts a vendor website for marketing letterpressed design products, in this example greeting cards. The website provides a graphical user interface (GUI) on a display screen of the user's computer 20. The GUI displays, to the user, templates of a variety of candidate greeting cards and enables the user to select one of the displayed card templates (e.g., by tapping on or clicking on the desired card template). The GUI receives (uploads) text and a design image from the user's computer 20 to the server 11. The uploaded design image in this example is a photograph. The website server 11 adds the text and photograph to the selected card template that is displayed on the GUI, to simulate a customized greeting card on the GUI. The GUI then enables the user to place a purchase order for a batch of (one or more of) physical greeting cards that match (are simulated by) the customized card that is displayed on the GUI. The GUI then receives the user's payment information (e.g., credit card information) for purchasing the cards.

Figure 2A:
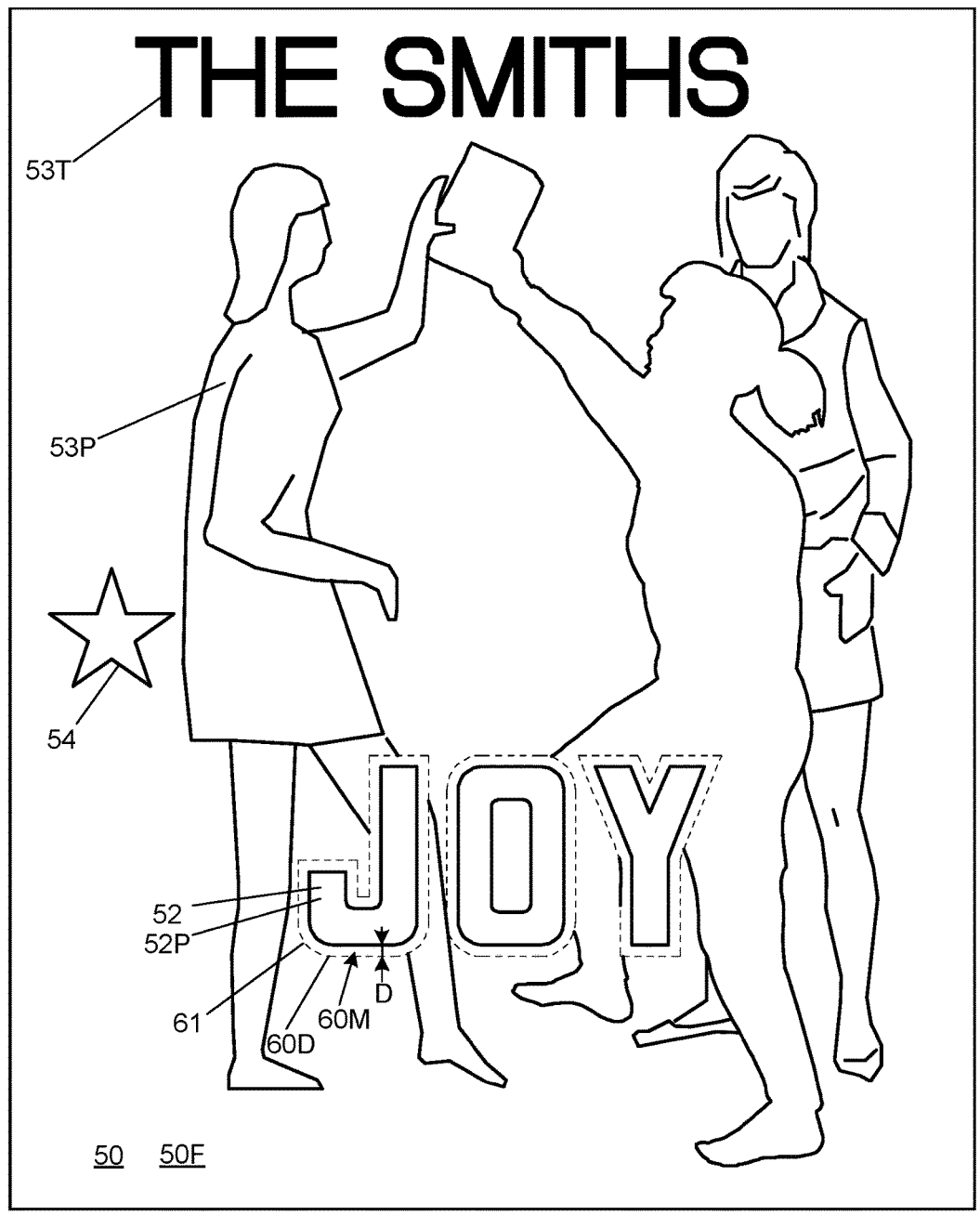

FIGS. 2A-2C show an example of the selected-and-customized card 50 that is displayed on the GUI and also manufactured into a physical card. The template portion of the card 50 is the portion that is not provided by the customer. The template includes a letterpress design element 52 that is common to all cards that are generated from the selected template. The letterpress design element 52 in this example comprises text characters (the word "JOY"). The letterpressed design element 52 may be applied by a letterpress debossing technique to a paper-like print stock material, which in this example is card stock.

In the example embodiment of FIGS. 2A-2C, a positive image 52P of the design 52 is debossed (depressed) into a front face 50F (front side) of the card stock (relative to the surrounding card surface). In one embodiment, a reverse image 52R of the design 52 is embossed (raised) on the rear face 50B (back) of the card (relative to the surrounding card surface). In another embodiment, the back 50B of the card remains planar and has no embossed image. The front face 5OF is the card face onto which the customer-provided components (e.g., text and photograph) are later printed.

The letterpress design element 52 in this example is applied by the print facility's letterpress machine 31. The machine 31 presses the card stock between a flat surface and a letterpress plate that is embossed with a reverse image of the design. The plate is pressed into the front surface 5OF of the card stock. Each template design is associated with a corresponding letterpress plate that generates the letterpress design element of the template. For a letterpressed design that includes different design components with respectively different colors, each different-colored design component is applied by a different plate. In one example, the plate is a rigid metal plate that is embossed with a raised image of the design. In another example, the plate is a flexible polymer sheet that is embossed with a raised image of the design and that has an adhesive backing for securing the plate to the letterpress machine. The letterpressing operation might be inked or inkless. In inkless letterpressing, the letterpressed design is manifested only by paper deformation. In inked letterpressing, ink is added to the raised design on the letterpress plate by coating the plate's raised design with ink before the raised design is pressed into the card stock.

In one example procedure, each sheet of card stock that is placed in the letterpress machine is the size of multiple cards. For example, the sheet might be twice the length and twice the height of a single card, to yield four card shells. Each compression by the letterpress machine would press four identical designs into the sheet. And the sheet would then be cut in half vertically and cut in half horizontally, to yield four identical card shells.

The card 50 (FIGS. 2A-2C) also includes a non-letterpressed printed design element 54 (a star in this example) of the template. The template's printed design element 54 might be printed by the printer 32 on the card's front face 50F before the letterpress operation. A printed element 54B might be printed on the card's back 50B before the letterpress operation. The card 50 also includes customer-provided design elements, which in this example are customer-entered text 53T and an uploaded photograph 53P.

The print facility 30 maintains in stock (stores) a variety of letterpress plates 33, one plate for each card template that might be ordered. For each letterpress design that includes more than one color, the print facility 30 maintains one letterpress plate for each color. The print facility 30 also maintains in stock (stores), for each available card template, a stock of semi-completed cards 34 (card shells, card precursors). The card shells are semi-completed in that they are debossed with the letterpress design element 52 but do not yet include any customer-provided design elements. So, for example, before receiving purchase orders for cards based on a particular template, the print facility 30 prepares for the future purchase orders by producing a batch of semi-completed card shells 34 imprinted with the letterpress element of the particular template, and maintains those card shells in stock.

Figure 3A:
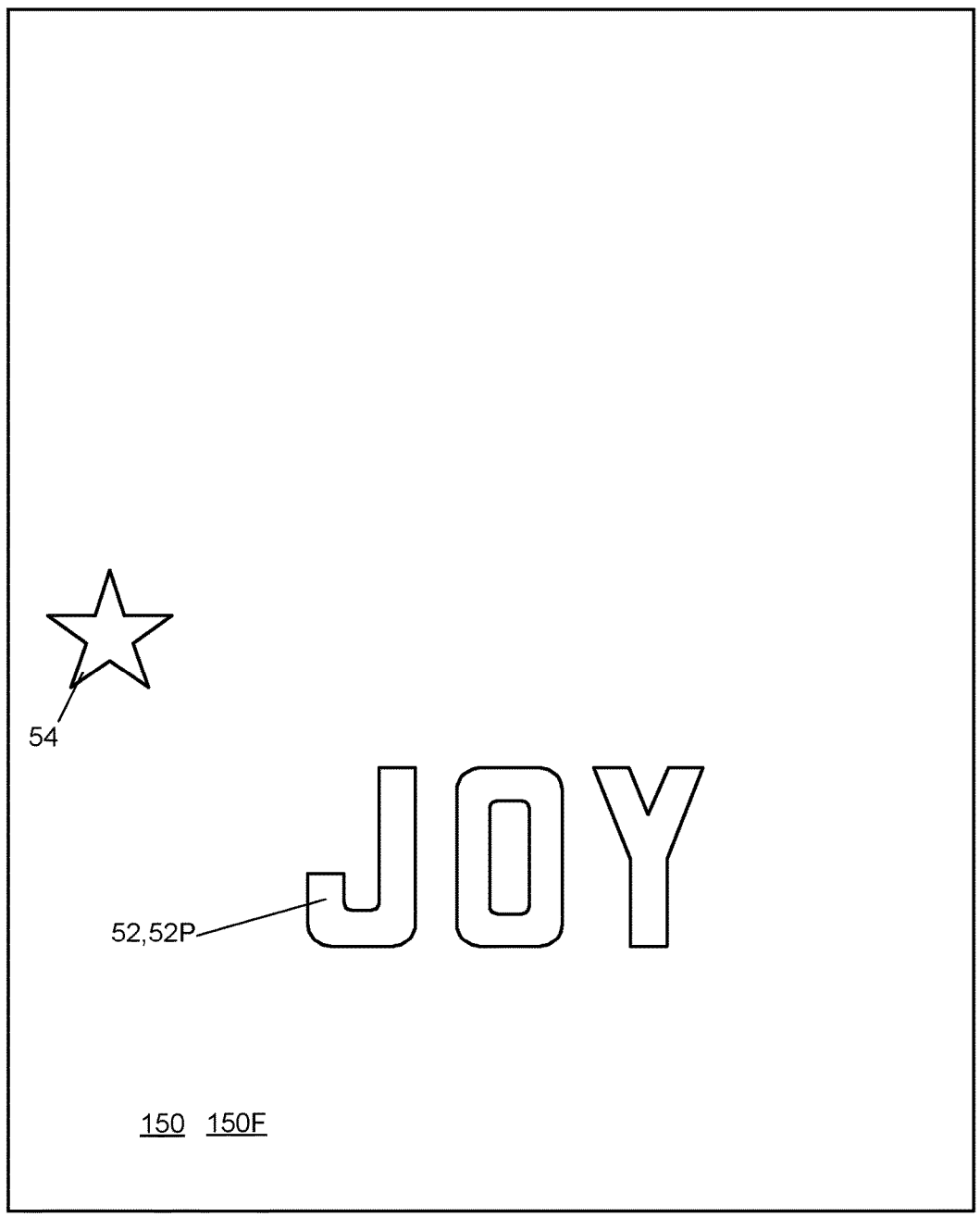

FIGS. 3A-3C show a first example card shell 150. The first example card shell 150 has the letterpressed design 52, with the positive image 52P debossed into the shell's front face 150F and the reverse image 52R of the design optionally raised on the shell's rear face 150B (back). In the first example, before letterpressing, the printer 32 prints a printable element 54 (in this example a star) of the template onto the card stock's front face 150F. Similarly, before letterpressing, the printer 32 might print a printable element 54B on the card stock's back 150B. Then the letterpress 31 letterpresses the design 52 into the printed card stock to generate the shell 150.

Figure 4A:
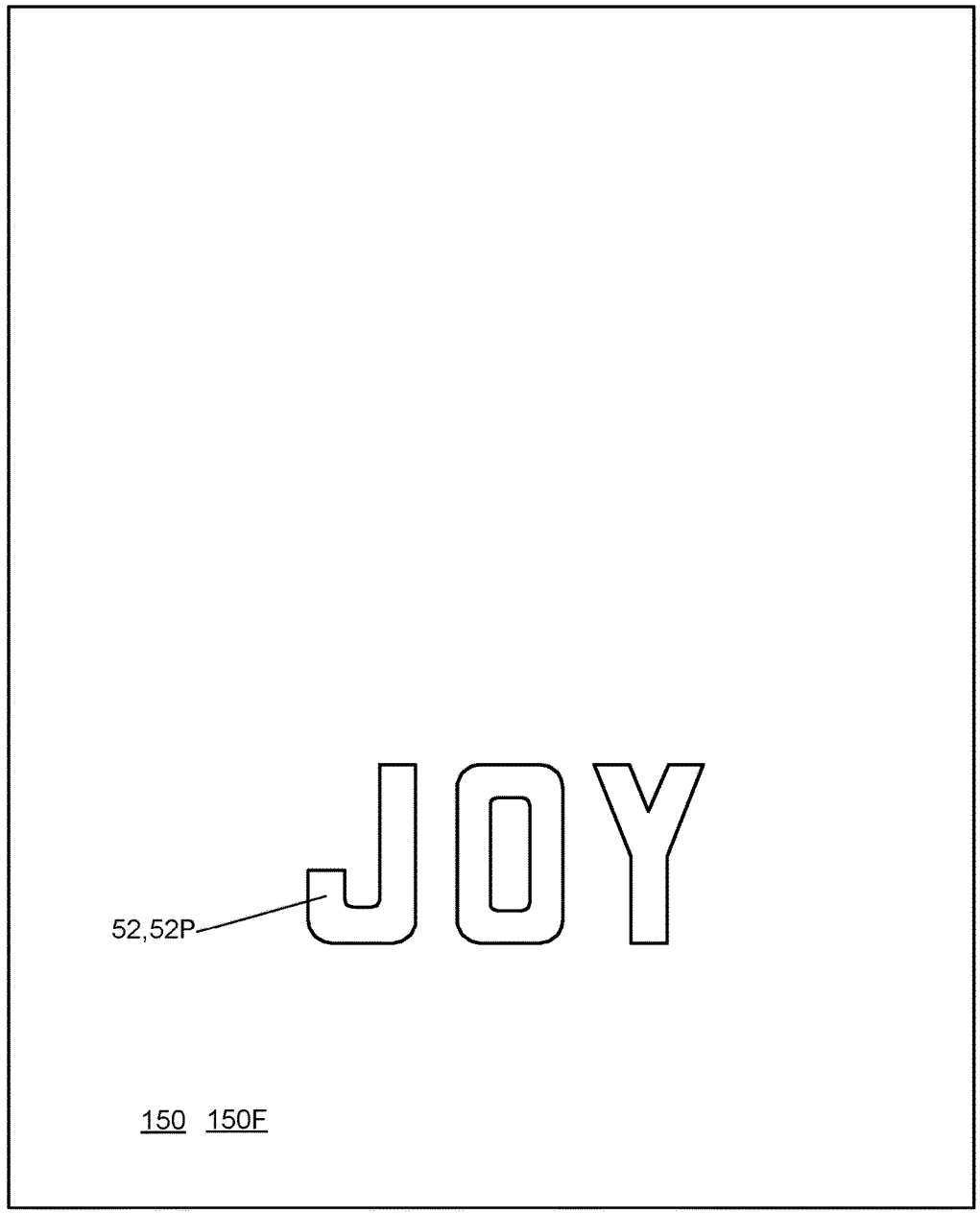

FIGS. 4A-4C show a second example card shell 150'. The second example card shell 150' does not have a printed element of the template on its front and back faces 150F', 150B'. The front-face printed element 54 of the template is printed onto the card shell 150' when (in the same print run as) printing the customer-provided elements (e.g., photograph 53P and text 53T) onto the card shell 150'. The printer 32 would print, onto each card shell 150', a composite digital image file that includes both the customer-provided elements 53P, 53T and the front-face printable template element 54.

In a third example shell (not shown), the template's rear-face printable element 54B is printed on the back 150B of the card shell 50 before letterpressing is performed. And the template's front-face printable element 54 is printed on the front face 150F in the same print run, and from the same composite digital image file, as the customer-provided elements 53P, 53T.

The number of semi-completed card shells prepared in a single letterpress batch (letterpress run) for future purchase orders of a particular template might be sufficient to cover a significant number of future purchase orders for that particular template. The significant number might be sufficient to cover the anticipated purchase orders for a particular amount of time (e.g., month) for that particular template. For example, if a typical (e.g., average) purchase order is for ten cards based on a particular template, and a typical (e.g., average) number of purchase orders for cards of that particular template in the particular amount of time (e.g., month) is five, then the print facility might prepare fifty card shells of the particular template in preparation for future orders for cards of that particular template. In an example, a number of card shells produced in a single letterpress run might be at least ten times the number of card shells printed for a customer in a printing run.

When the server 11 receives an order for a particular number of cards of a selected-and-customized template, a worker of the print facility pulls that particular number of card shells 150 from the stock 34. The worker places the card shells in the printer 32. The printer 32 prints an image, stored in a digital file, onto the card shell's front face 50F. The digital file might include the customer-provided elements (e.g., photo 53P and text 53T). The digital file might further include elements 54 that are common to the template.

The debossing of the card shell might reduce quality of the printing. One feature that improves print quality on the letterpressed shell is the card stock having a thickness in the range 16 point to 20 point. Another feature that improves print quality on the shell is using card stock (paper stock) that is uncoated and digitally treated.

Another feature that facilitates print quality on the shell is the debossed image of the design having a depth in the range 0.022 inch to 0.030 inch, as measured when the letterpressing is completed and before the printing is started. A debossed image of smaller depth (right after the letterpressing) might become flattened (or too flat) by the printing step. A debossed image of greater depth (right after the letterpressing) might degrade quality of the printing.

Another feature that facilitates printing on the shell and helps avoid damage to the printer is the printed matter (e.g., text and non-text) being spaced at least 1/32 inch from the debossed image. To attain an aesthetically pleasing appearance, that appears to combine the printed matter with the debossed image, the printed matter (e.g., text and non-text) reaches to a distance of 1/16 inch or less from the debossed image.

FIG. 2A illustrates one example of implementing the spacing between printed matter and debossed design. This example entails defining an imaginary demarcation line 60D that follows along a periphery 61 of the letterpress element 52 and is spaced by a constant distance D from the periphery 61. The demarcation line 60D is portrayed in the drawings as a dashed line that would not be present or seen in an actual card. A printed element, such as the customer-provided image 53P, is cropped by the imaginary demarcation line 60. The user-provided photograph 53P thus defines a margin 60M around the periphery 61 of the letterpress element 52. Width (thickness) of the margin 60M might be uniform and in the range 1/32 inch to 1/16 inch. The customer-provided photograph 53P is cropped by the margin 60M. The area occupied by the margin 60M might lack printing, and therefore disclose the color of the raw paper card stock.

Figure 5:
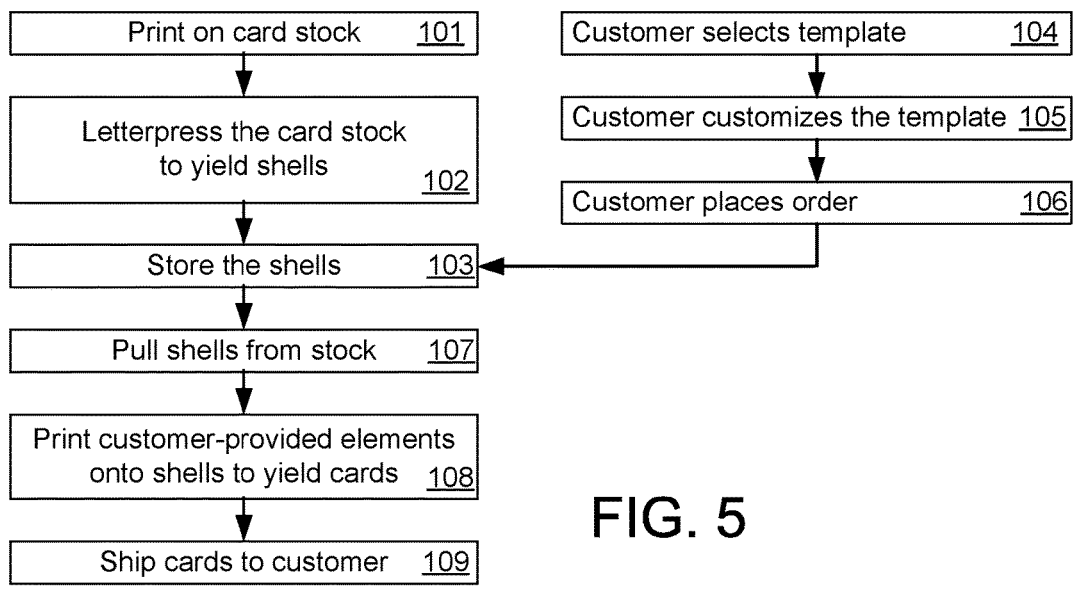
FIG. 5 is a flow chart of an example method for using the system of FIG. 1 to generate letterpressed printed items.

FIG. 5 is a flow chart of an example method for generating letterpressed art products, in this example cards. A worker at a print facility associated with a vendor prepares for future purchase orders by preparing batches of card shells. Each batch of prepared card shells corresponds to a respective template that customers might select. The preparation of a batch of card shells includes using the printer 32 to print 101 printed elements of the respective template on the back and optionally on the front of card stock, and then using the letterpress 31 to letterpress 102 the card stock with the letterpress design of the respective template. Each batch of prepared card shells is stored 103 in stock. A customer uses a GUI of a website of the vendor to select 104 a card template and customize 105 the template. The customization includes adding customer-provided elements (e.g., photo and text) to the template. The customer then uses the GUI to place an order 106 for a particular number of cards that are simulated by the selected-and-customized template. A worker at the print facility fills the order by pulling 107, from stock, the particular number of card shells from the batch that corresponds to the customer-selected template. The worker uses the printer 31 to print 108 the customer-provided elements, along with print elements of the selected template, onto the card shells. The worker then ships 109 the letterpressed-and-printed cards to the customer The components and procedures described above provide examples of elements recited in the claims. They also provide examples of how a person of ordinary skill in the art can make and use the claimed invention. They are described here to provide enablement and best mode without imposing limitations that are not recited in the claims. In some instances in the above description, a term is followed by an alternative term enclosed in parentheses.

The invention claimed is:

1. A method comprising:
    letterpressing a design into card stock, to create a card shell having a positive image of a letterpressed design debossed into a front face of the card shell; and
    after letterpressing the design, printing an image onto a non-debossed portion of the card shell's front face, to produce a letterpressed printed card;
    wherein:
    the printed image comprises at least a portion of a digital photograph that is uploaded by a customer;
    the letterpressed design is not provided by the customer; and
    the printed image differs from the uploaded digital photograph in that a portion, of the uploaded digital photograph, that is within a margin, of a uniform width, around the letterpressed design is absent from the image.

2. The method of claim 1, wherein letterpressing the design yields a reverse image of the letterpressed design embossed on a rear face of the card shell.

3. The method of claim 2, further comprising printing on the rear face prior to letterpressing the design.

4. The method of claim 1, wherein the letterpressing comprises inked letterpressing.

5. The method of claim 1, further comprising:
    receiving, after the letterpressing and before the printing, a purchase order from the customer for the letterpressed printed card.

6. The method of claim 1, wherein the uniform width is in the range 1/32 inch to 1/16 inch.

7. The method of claim 1, wherein the letterpressing generates the debossed image with a depth in the range 0.022 inch to 0.030 inch, and the card stock is uncoated and digitally treated, and the card stock has a thickness in the range 16 point to 20 point.

8. The method of claim 1, wherein:
    letterpressing the design includes letterpressing the design into multiple pieces of card stock to create a first number of card shells having a positive image of the letterpressed design debossed into front faces of the card shells;
    printing the image includes printing the image onto a second number of the card shells for the customer; and
    the first number is at least ten times the second number.

9. The method of claim 8, wherein the customer is a first customer, the printed image is a first customer-provided image provided by the first customer, and the method further comprising:
    after the letterpressing, printing a second customer-provided image onto a third number of the card shells for a second customer.

10. The method of claim 1, further comprising printing on the front face prior to the letterpressing.

11. The method of claim 1, wherein the letterpressed design comprises text characters.

12. The method of claim 1, wherein the printing on the debossed card shell is performed by a digital printing press from a digital image file.

13. The method of claim 1, wherein the letterpressing is performed by a letterpress machine configured to press the card stock between a flat surface and a letterpress plate that is embossed with a reverse image of the design.

14. The method of claim 1 wherein:
    the letterpressing yields a reverse image of the letterpressed design embossed on a rear face of the card;
    the method further comprises printing on the front face prior to the letterpressing, and printing on the rear face prior to the letterpressing;
    the letterpressing comprises inked letterpressing;
    the letterpressing generates the debossed image with a depth in the range 0.022 inch to 0.030 inch;
    the card stock is uncoated and in the range 16 point to 20 point; and
    the letterpressing is performed by a letterpress machine that presses the card stock between a flat surface and a letterpress plate that is embossed with a reverse image of the design.

15. The method of claim 1, wherein no portion of the image is printed onto the letterpressed design.

16. A method comprising:
letterpressing a design into card stock, to create a card shell having a positive image of a letterpressed design debossed into a front face of the card;
defining, around the design, a margin of a uniform width;
receiving a digital photograph uploaded by a customer;
cropping the digital photograph at the margin to yield an image, such that the image differs from the uploaded digital photograph at least in that a portion, of the uploaded digital photograph, that is within the margin, is absent from the image; and
after letterpressing the design, printing the image onto a non-debossed portion of the card shell's front face, to produce a letterpressed printed card.

17. The method of claim 16, wherein the uniform width is in the range ⅟₃₂ inch to ⅟₁₆ inch.

\* \* \* \* \*